United States Patent [19]

Heikkilä

[11] Patent Number: 6,070,655

[45] Date of Patent: Jun. 6, 2000

[54] HEAT EXCHANGER

[75] Inventor: Pertti Heikkilä, Raisio, Finland

[73] Assignee: Valmet Corporation, Helsinki, Finland

[21] Appl. No.: 08/870,791

[22] Filed: Jun. 6, 1997

[30] Foreign Application Priority Data

Jun. 7, 1996 [FI] Finland ................................. 962364

[51] Int. Cl.$^7$ ..................................................... F28B 3/04
[52] U.S. Cl. ........................... 165/111; 165/112; 165/900; 96/266; 96/356; 261/153
[58] Field of Search ..................... 165/111, 112, 165/113, 900; 261/153; 96/266, 356

[56] References Cited

U.S. PATENT DOCUMENTS

| | | | |
|---|---|---|---|
| 2,825,210 | 3/1958 | Carr | 261/153 X |
| 3,724,537 | 4/1973 | Johnson . | |
| 3,799,249 | 3/1974 | Linhardt | 261/153 X |
| 3,833,205 | 9/1974 | McAnespie | 261/153 X |
| 4,141,702 | 2/1979 | deVries . | |
| 4,190,102 | 2/1980 | Gerz . | |
| 4,284,609 | 8/1981 | deVries . | |
| 4,305,909 | 12/1981 | Willett et al. . | |
| 4,364,910 | 12/1982 | Willett et al. . | |
| 4,476,065 | 10/1984 | McKey | 165/900 X |
| 4,592,419 | 6/1986 | Ishida et al. | 165/112 |
| 4,705,654 | 11/1987 | Niwa et al. | 261/153 X |
| 4,799,941 | 1/1989 | Westermark | 95/199 |
| 5,178,210 | 1/1993 | Guillet et al. . | |
| 5,534,230 | 7/1996 | Johnson et al. | 261/153 X |

FOREIGN PATENT DOCUMENTS

| | | |
|---|---|---|
| 0160717 | 11/1985 | European Pat. Off. . |
| 0162199 | 11/1985 | European Pat. Off. . |
| 2678047 | 12/1992 | France . |
| 1169436 | 5/1964 | Germany ............................... 165/111 |
| 2300295 | 7/1974 | Germany . |
| 168293 | 8/1959 | Sweden . |
| 7808858 | 8/1980 | Sweden . |
| 222347 | 4/1943 | Switzerland . |
| 485187 | 3/1970 | Switzerland . |
| 526758 | 9/1972 | Switzerland . |
| 1409319 | 10/1975 | United Kingdom . |

OTHER PUBLICATIONS

Abstract (1 page), Patent Joernaal, Sep. 1985.

*Primary Examiner*—Leonard Leo
*Attorney, Agent, or Firm*—Steinberg, Raskin & Liberchuk, P.C.

[57] ABSTRACT

A heat exchanger, for use in particular in connection with the process outlets at paper, pulp and board mills, including substantially parallel tubes or equivalent arranged in a duct. An air flow that delivers heat passes through the tubes and an air flow that receives heat passes through gaps between the tubes in accordance with the cross-flow principle. The heat faces of the tubes are made larger at the side of the flow that receives heat by means of ribs, lamellae or equivalent, and an air that is moist, saturated, or near its saturation curve is used as the air flow that delivers heat in the heat exchanger.

5 Claims, 4 Drawing Sheets

HEAT EXCHANGER

FIELD OF THE INVENTION

The present invention relates to a heat exchanger, for use in particular in connection with the process outlets at paper, pulp and board mills, which comprises a number of substantially parallel tubes or equivalent arranged in a duct. An air flow that delivers heat is passed through the tubes and an air flow that receives heat is passed through gaps between the tubes in accordance with the cross-flow principle. In the heat exchanger, the heat faces of the tubes have been made larger at the side of the flow that receives heat by means of ribs, lamellae or equivalent.

The present invention also relates to a method for transferring heat from a moist exhaust air flow to a drier air flow utilizing a heat exchanger operating on the cross-flow principle.

BACKGROUND OF THE INVENTION

As known in the prior art, a principal object of heat recovery systems is to replace primary energy in an economical way. In heat recovery systems, heat exchangers are used, of which the most important types are a plate heat exchanger and a tubular heat exchanger. In prior art plate heat exchangers, a plate structure forms two systems of ducts perpendicular to one another, and a medium that delivers heat flows in one set of ducts and a medium that receives heat flows in the other set of ducts, the heated receiving medium being passed further to reuse. Tubular heat exchangers are generally provided with a supply of steam or water, and the tubes are surrounded by ribs or equivalent so as to increase the heat exchange area. In lamellar radiators, the tubes are typically fitted between a plate structure, and water flow in the ducts formed by the plate structure, for example glycol water.

OBJECTS AND SUMMARY OF THE INVENTION

It is an object of the present invention to provide an air-air heat exchanger by whose means a more efficient transfer of heat is achieved compared with prior art constructions.

It is a further object of the present invention to provide a compact heat exchanger which does not occupy an overly large amount of space in the heat exchange systems.

It is another object of the present invention to provide a new and improved heat exchanger operating on the cross-flow principle.

It is still another object of the present invention to provide a new and improved method for transferring heat between a moist air flow and a drier air flow.

In view of achieving the objects stated above and others, in the heat exchanger in accordance with the invention, an air flow that is moist, saturated, or near its saturation curve is arranged to be used as the air flow that delivers heat in the heat exchanger, the air flow that delivers heat is arranged to flow in the tubes substantially from a top of each tube toward a bottom of each tube, and the air flow that receives heat is arranged to flow in a direction substantially horizontally through gaps between the tubes. In this manner, the water that condenses from the moist air flow that delivers heat in the tubes flows downward along inner walls of the tubes and is collected in a basin placed in the duct of the heat exchanger below the bottom of the tubes. The heat exchanger may also comprises a spray system, by whose means water is sprayed before the heat exchanger proper, i.e., before the tubes, into the air flow that delivers heat in order to enhance the transfer of heat by means of an atomized water phase.

Indeed, the heat exchanger in accordance with the invention preferably comprises a spray system, by whose means water or an aqueous medium is sprayed before the heat exchanger proper into the air flow that delivers heat. The purpose of this is to transfer heat in the spraying stage from the air flow that delivers heat to the water that is sprayed, which water further delivers heat to the air flow to be heated as it flows down along the walls of the tube, and at the same time drops are separated from the water film flowing down along the walls of the tube. These drops are later returned back into the water film, which enhances the transfer of heat from the air flow that delivers heat.

In the air-air heat exchanger in accordance with the present invention, a flow of moist air that is saturated or near its saturation curve is used as the medium that delivers heat, such air being, for example, the air in the process outlets at paper, pulp and board machines, in particular the exhaust air at dryer sections of such machines. In such a case, at the side of the medium flow that delivers heat the transfer of heat is considerably more efficient because water condenses from the moist exhaust air.

In accordance with the invention, the following arrangement is used in order to provide an efficient and compact heat exchanger. In a heat exchanger in accordance with the invention, the exhaust air flows from the top toward the bottom in the tubes, i.e., from a top inlet to a bottom outlet, each of which may have a substantially circular cross-sectional shape, and the replacement air flows in a direction substantially horizontally through the gaps between the tubes in accordance with the cross-flow principle. At the replacement air side, the heat transfer face has been made larger by means of the principle known from the prior art rib-tube radiators or lamellar radiators, in which connection it is possible to utilize the more efficient transfer of heat at the exhaust air side. The condensate formed in the tubes flows down along the tubes and is collected in collecting means such as a basin located at the bottom of the duct below the outlets of the tubes. The condensate collected in the basin at the bottom may be recirculated to be sprayed back into the top portion of the heat exchanger, in which connection a water flow of a certain magnitude flows constantly through the tubes.

It is a primary objective of this arrangement that, by the effect of the exhaust air flow, drops are continually separated from the water film that flows down, which drops collide again against the tube walls. Out of the exhaust air, heat is transferred efficiently into the drops and further into the tube walls as the drops are returned into the water film that flows down. Also, a significant extent of transfer of heat takes place between the water that is sprayed and the exhaust air even at the spraying stage before the heat exchanger proper. When this heated water flows down along the walls of the tube, by its means, energy is transferred directly from the water into the tube wall. Further, the water film flowing down along the tube walls is somewhat uneven in view of the shear forces arising from the difference in speed between the air flow and the water film, which further enhances the convective transfer of heat, compared with a smooth tube. In the arrangement in accordance with the invention, washing devices are not needed because the water spray system replaces them, i.e., serves as a substitute therefor. For example, in the heat exchangers in accordance with the invention arranged in connection with the outlets of the wire parts in paper machines, separate water separators are not needed because the passage of water along with the exhaust air is exclusively desirable. Preferably, in an arrangement in accordance with the invention, there are drop traps after the heat exchanger.

A heat exchanger in accordance with the invention can be applied, e.g., to the removal of humidity from the exhaust air of a hood or a wire part, or it can be used for heating the ventilation air for these systems by means of the air flows mentioned above.

One embodiment of the method in accordance with the invention for transferring heat from an air flow that delivers heat to an air flow that receives heat utilizing a heat exchanger operating on the cross-flow principle comprises the steps of arranging substantially parallel tubes in a duct to define gaps therebetween, directing air that is moist, saturated, or near its saturation curve into and through the tubes to constitute the air flow that delivers heat, directing the air flow that receives heat in a substantially horizontal direction through the gaps over an external surface of the tubes and spraying an aqueous medium into the air flow that delivers heat before the air flow that delivers heat enters into the tubes. Each tube includes an inner wall, an inlet at a top region and an outlet at a bottom region below the inlet such that in each tube, the air flow that delivers heat flows downwardly from the inlet to the outlet and condensate forms on the inner wall of the tube and flows toward the outlet. The condensate flowing along the inner walls of the tubes is collected upon exiting from the tubes at the outlets thereof. The external surface area over which the flow that receives heat passes may be increased by arranging members to project from the external surface of the tubes into the gaps. At least a portion of the collected condensate may be passed to be sprayed into the air flow that delivers heat such that the sprayed aqueous medium is collected condensate. This portion of collected condensate may be subjected to regulated heating. It is possible to heat the aqueous medium if the temperature and the moisture of the air flow that delivers heat differ substantially from values that are near its saturation curve.

In one particular embodiment, the air flow that delivers heat is divided or partitioned into first and second components, the aqueous medium is sprayed only into the first component, and this first component is the component directed in close proximity to an inlet of the air flow that receives heat into the gaps between the tubes.

The aqueous medium spraying step may entail providing an atomized spray of the aqueous medium, in which case, this atomized spray of aqueous medium may be controlled to enable the formation of a water film on the inner walls of the tubes such that drops of the condensate flowing along the inner walls of the tubes separate from the inner walls, receive heat from the air flow that delivers heats and then recontact the inner walls of the tubes.

In the following, the invention will be described in more detail with reference to the figures in the accompanying drawings. However, the invention is not strictly confined to the details of the illustrated embodiments.

BRIEF DESCRIPTION OF THE DRAWINGS

Additional objects of the invention will be apparent from the following description of the preferred embodiment thereof taken in conjunction with the accompanying non-limiting drawings, in which.

DETAILED DESCRIPTION OF THE PREFERRED EMBODIMENTS

Figure 1:
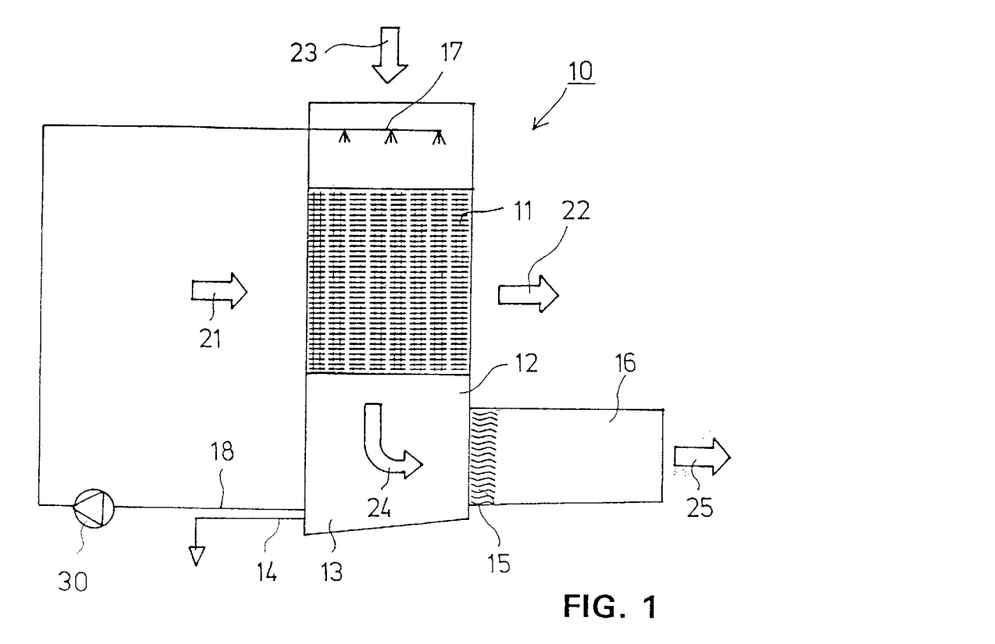
FIG. 1 is a schematic illustration of a heat exchanger in accordance with the invention.

Referring to FIGS. 1–8 wherein like reference numerals refer to the same or similar elements, as shown in FIG. 1, a flow of exhaust air 23 and a flow of replacement air 21 are passed in accordance with the cross-flow principle through a heat exchanger 10 in accordance with the invention. The heat exchanger 10 includes means for directing the exhaust air flow 23 and replacement air flow 21 into and through the heat exchanger 10, e.g., fans, etc. The heat exchanger 10 comprises a number of ribbed tubes 11 through which the exhaust air flow 23 is passed and the replacement air flow 21 is passed through gaps defined between the tubes, i.e., the air flows 23,21 have been passed in accordance with the cross-flow principle. Into the flow of exhaust air 23, moisture, for example condensate, is sprayed by means of spray devices 17, after which the exhaust air 23 and the condensate pass through the heat exchanger 10 substantially from the top towards the bottom, i.e., from inlets of the tubes located in an upper region of the duct 12 (or heat exchanger 10) to outlets of the tubes located in a bottom region of the duct 12 (or heat exchanger 10). The water condensed in the tubes 11 flows into a basin 13 located at the bottom of a duct 12. From the basin 13, the water is removed along an exhaust duct 14, or it is recirculated to be used again in the spray devices 17 of the spray system. In the latter instance, it is passed into a duct 18, in which there is a pump 30 or an equivalent actuator for passing the flow of water into the spray devices 17. The cooled flow of exhaust air 23, which contains drops and which has passed through the heat exchanger 10, is passed through a drop trap 15 into the exhaust duct 16 as a flow 25. The flow of heated replacement air which has passed through the heat exchanger 10 is denoted by reference arrow 22. As shown in FIG. 1, the exhaust air flow 23 is introduced into the top portion of the heat exchanger 10, in which condensate taken from the basin 13 at the bottom is sprayed into the exhaust air flow. After this, the exhaust air flow 23 and the condensate pass through the heat exchanger 10, in which connection, the exhaust air and the condensate heat the replacement air flow 21, whereby heated replacement air is obtained (flow 22). In the lower portion of the heat exchanger 10, the condensate that flows as a film on the walls of the tubes 11 falls mostly onto the bottom of the basin 13 at the bottom of the duct 12. The drops that were grasped by the exhaust air flow 24 are carried along with it are separated in the drop trap 15.

Figure 2:
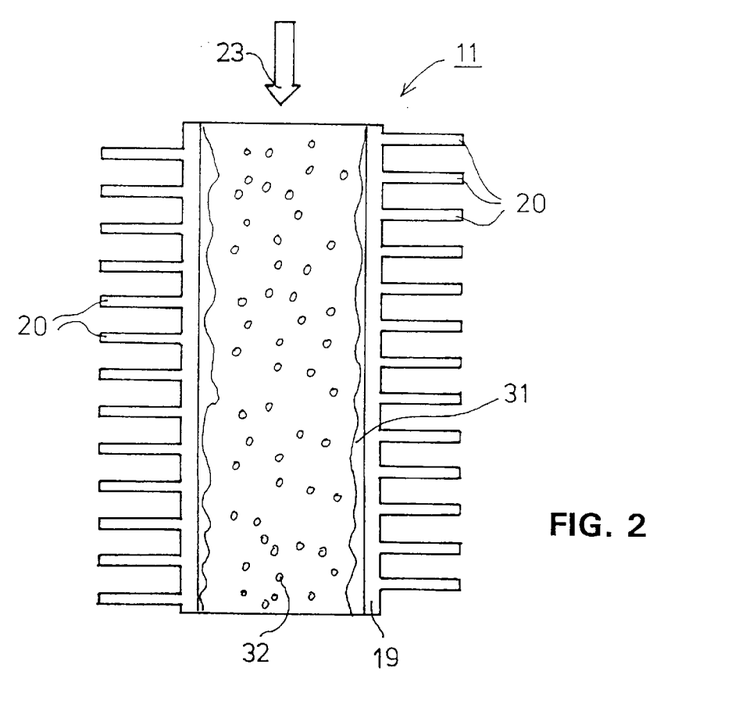
FIG. 2 is a schematic illustration of the principle of the flows of air and water in an individual ribbed tube in a heat exchanger in accordance with the invention.

FIG. 2 is a schematic illustration of a single ribbed tube 11. The walls of the tube 11 are denoted by reference numeral 19 and the ribs, which have been formed onto the exterior wall of the tube 11 in order to increase the heat exchange area, are denoted by reference numeral 20. When the exhaust air flow 23 and the condensate or equivalent medium introduced into it by means of the spray device 17 are passed through the ribbed tube 11, a water film 31 is formed on the walls 19 of the tube 11, and part of the moisture passes as drops 32 in the middle of the ribbed tube 11.

Figure 3:
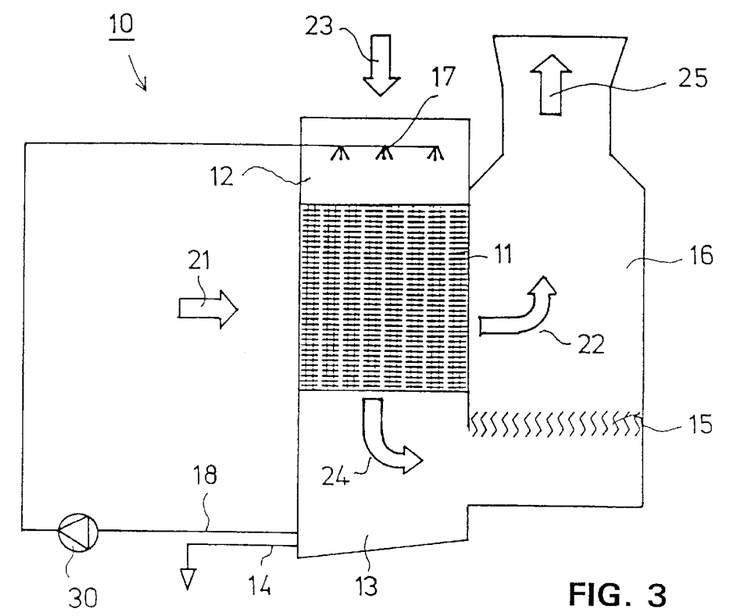
FIG. 3 shows an application in which the heat exchanger is used for separation of moisture out of the exhaust air and for the removal of mist from the cooled exhaust air.

FIG. 3 illustrates the use of the heat exchanger 10 for separation of moisture from the exhaust air flow 23 and for the removal of mist, when the flow of cold outdoor air 21 is passed through the heat exchanger 10, in which connection, a flow of heated outdoor air 22 is obtained. The moist exhaust air flow 23 obtained, e.g., from the process outlets, is passed through the tubes 11 in the heat exchanger 10 through the drop trap 15 so that it is combined with the heated outdoor air flow 22. In FIG. 3, the flow of cold outdoor air is denoted by reference numeral 21 and the flow of heated outdoor air is denoted by reference numeral 22. The exhaust air flow 23 is passed through the heat exchanger 10, and condensate or equivalent moisture is mixed into the air by means of spray devices 17, in which connection, the cold outdoor air can be heated in the heat exchanger 10. The exhaust air 24 which contains drops and which has been passed through the heat exchanger 10 is passed through the drop trap 15 to be combined with the heated outdoor air flow 22. In the heat exchanger 10, a large proportion of the moisture in the exhaust air condenses into water. This effect and the mixing of the heated outdoor air flow 22 with the exhaust air flow 24 reduce the formation of mist and the problems that arise from the mist when the mixture 25 of exhaust air and heated outdoor air flow is passed outdoors, i.e., to the ambient atmosphere. The water formed in the basin 13 at the bottom of the heat exchanger duct 12 is recirculated along the duct 18 further to the spray device 17, and any excess amount may be removed through the exhaust duct 14.

Figure 4:
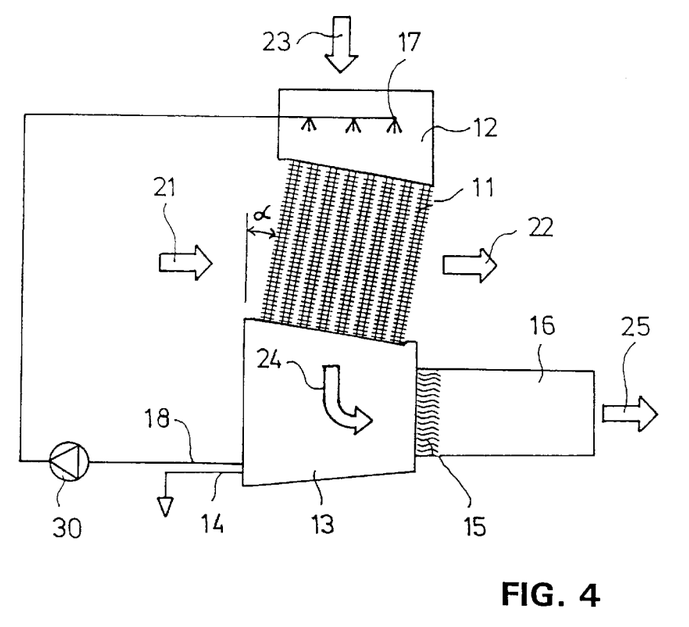
FIG. 4 is a schematic illustration of a second exemplifying embodiment of a heat exchanger in accordance with the invention.

The exemplifying embodiment shown in FIG. 4 corresponds to the exemplifying embodiment shown in FIG. 1, but in the embodiment shown in FIG. 4, in order to increase the heat exchange area, the ribbed tubes 11 in the heat exchanger 10 are positioned at an angle α in relation to the directions of the air flows 21,23, and the angle in relation to the vertical direction is from 0° to about 45°, preferably from 0° to about 15°.

As shown in FIGS. 1–4, in an air-air heat exchanger in accordance with the invention, a moist air that is saturated or near its saturation curve is used as the medium that delivers heat, such air consisting, for example, of the air from the process outlets at paper, pulp or board machines, in particular the exhaust air from dryer sections in such machines. In such a case, at the side of the medium flow that delivers heat, the transfer of heat is considerably more efficient, because water may condense from the moist exhaust air. In the heat exchanger 10, the exhaust air 23 flows from the top downward in tubes 11, which preferably have a circular cross-sectional shape, and the replacement air 21 flows horizontally through the gaps between the tubes 11 in accordance with the cross-flow principle. At the replacement air side, the heat transfer face has been increased over conventional prior art designs by means of the principle known from the prior art ribbed-tube radiators or lamellar radiators, i.e., ribs 20 are formed on the tube 11. In the tubes 11, the condensate water film 31 flows down and is collected in the basin 13 at the bottom. Condensate collected in the basin 13 at the bottom may be sprayed by means of spray devices 17 back into the top portion of the heat exchanger 10, in which connection, a water flow of a certain magnitude flows constantly through the tubes 11. It is an objective of this arrangement that, by the effect of the exhaust air flow 23,24, drops 32 are separated all the time, i.e., continually, from the water film 31 that flows down, which drops collide again against the walls 19 of the tube 11. While the drops 32 are extant, heat is transferred efficiently into the drops 32 in the middle of the tubes 11 from the exhaust air 23, and thereafter, heat is transferred into the walls 19 of the tube 11 as the drops 32 are returned into the water film 31 that flows down. Also, a significant extent of transfer of heat takes place between the water that is sprayed by means of the spray devices 17 and the exhaust air 23 even before the heat exchanger proper (provided the water is sprayed into the exhaust air flow at a location before the tubes 11). When this heated water 31 flows down along the walls 19 of the tube 11, energy is transferred directly from the water 31 into the wall 19 of the tube 11. Further, the water film 31 flowing down along the walls 19 of the tube 11 is somewhat uneven as a result of the effect of the shear forces arising from the difference in speed between the air flow 23 and the water film 31, which further enhances the convective transfer of heat, compared with a smooth tube.

Figure 5:
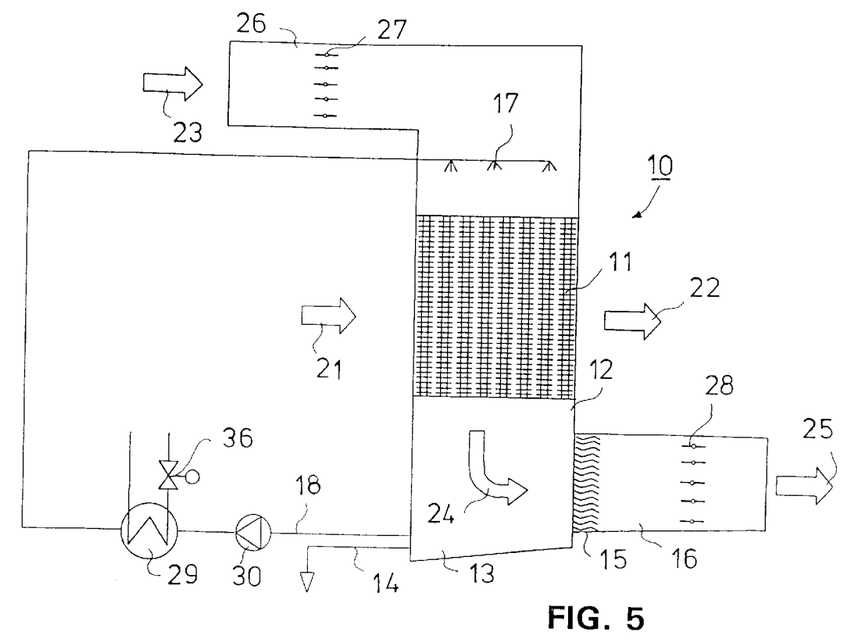
FIG. 5 is a schematic illustration of a third exemplifying embodiment of a heat exchanger in accordance with the invention.

The exemplifying embodiment of the invention shown in FIG. 5 is substantially similar to the exemplifying embodiments of the invention shown in FIGS. 1 and 3, but in the exemplifying embodiment shown in FIG. 5, it has been taken into account that, by means of the heat exchangers shown in FIGS. 1, 3 and 4, it is possible to produce a flow of heated replacement air 22 only when warm and moist exhaust air 23 is fed, e.g., from a paper machine, into the heat exchanger 10. However, during breaks and standstills, the supply of exhaust air 23 to the heat exchanger 10 can be discontinued, because the temperature and the moisture of the exhaust air 23 are considerably lower than in a production situation. If heated replacement air 22 must also be produced during breaks and standstills, a spare heating system 29 is needed.

In the exemplifying embodiment shown in FIG. 5, the additional heating, which may be used during interruptions in the flow of exhaust air (or whenever the moisture and temperature of the exhaust air flow differ substantially from values near the saturation curve), has been accomplished by heating the water flow in the duct 18, i.e., the water flow to be sprayed by means of the spray devices 17 into the top portion of the heat exchanger 10 is heated prior to being sprayed. The heating of the water flow can be accomplished by any appropriate heating system, for example, by means of a steam heat exchanger 29 which heats the water flow taken from the basin 13 at the bottom and passing through the duct 18 or, in the simplest version, by ejecting steam directly into this water flow. When the supply of exhaust air 23 is stopped completely, the heating of the replacement air 21 relies exclusively on the water circulation, in which case the temperature of the water is regulated based on the requirement of heating by means of regulation members 36 arranged in connection with the steam heat exchanger 29. In order to avoid outflow of heat, i.e., to avoid discharge of moist air and losses of energy, the exhaust air ducts 26,16 passing into the heat exchanger 10 and departing from the heat exchanger 10, respectively, can be closed by means of a latticework 27,28 when the supply of exhaust air 23 has been stopped, or other comparable duct closing arrangements.

Figure 6:
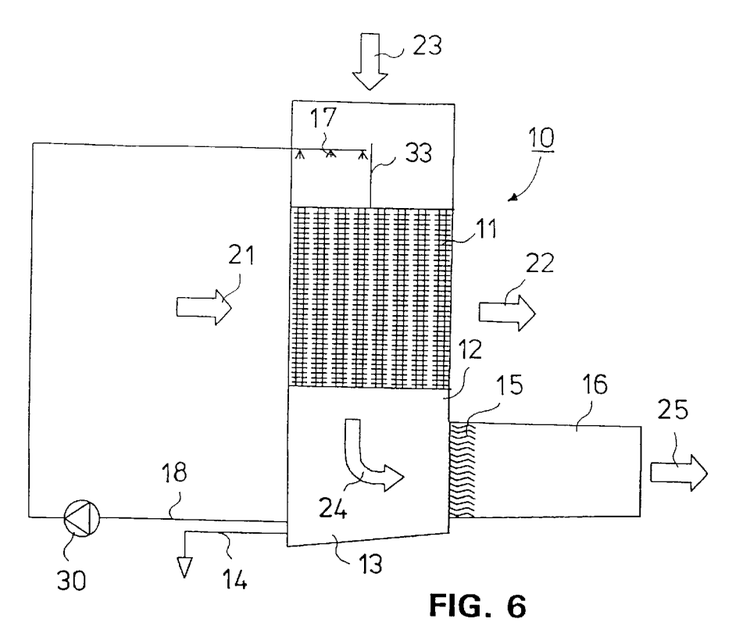
FIG. 6 is a schematic illustration of a fourth exemplifying embodiment of a heat exchanger in accordance with the invention.

The exemplifying embodiment of the invention shown in FIG. 6 is, with respect to its principal features and operation, similar to the exemplifying embodiment shown in FIG. 1, but in the embodiment shown in FIG. 6, the top portion of the heat exchanger duct 12 is divided into two parts by means of a wall 33 so that the spraying of water by means of the spray devices 17 takes place only in a portion or component of the replacement air flow 21 placed next to the inlet of the replacement air flow 21 into the gaps defined between the tubes 11. This embodiment is advantageous because, under certain conditions, it is possible to achieve a higher ultimate temperature of the replacement air.

Figure 7:
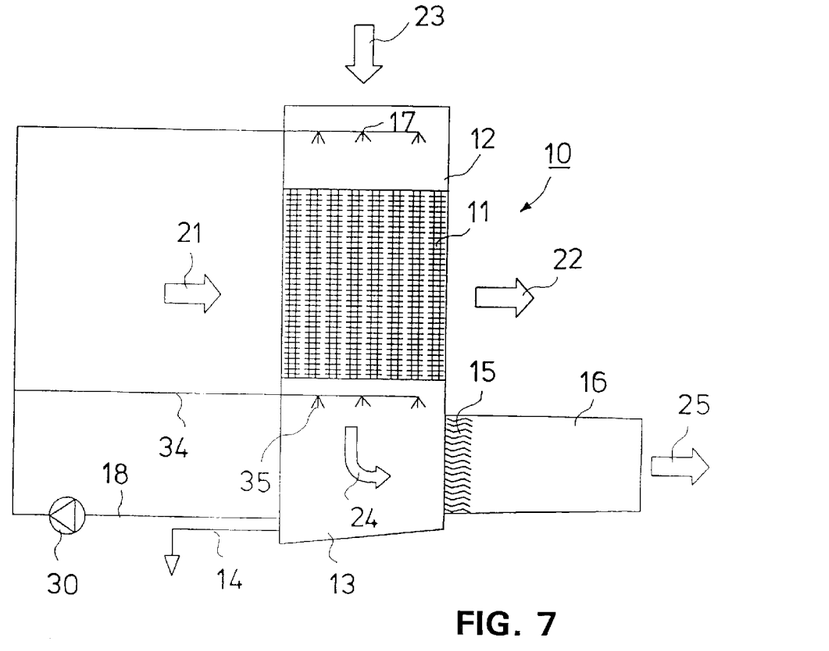
FIG. 7 is a schematic illustration of a fifth exemplifying embodiment of a heat exchanger in accordance with the invention.

Regarding its principal features and operation, the embodiment in FIG. 7 is similar to the exemplifying embodiments shown in the preceding figures, but in the exemplifying embodiment of the invention shown in FIG. 7, a scrubber 35, i.e., a spray water tower, is arranged in the heat exchanger duct 12 after the heat exchanger 10, i.e., below the tubes 11, in which scrubber the water to be sprayed into the top portion of the heat exchanger is preheated. To this end, the duct 18 is branched into a scrubber duct 34, in which spray devices 35 are arranged. In this embodiment of the invention, the temperature of the water pumped out of the basin at the bottom is raised by making use of the energy of the exhaust air to be blown out.

The heat exchanger in accordance with the invention is suitable for use as a heat exchanger, for example, for replacement air for a paper machine or for any other application of recovery of heat. The heat exchanger in accordance with the invention can be used highly advantageously in process outlets at paper, pulp and board machines, in particular in the process outlets of a dryer section of such machines.

In the arrangement in accordance with the invention, very finely divided mist is sprayed, and a separate atomizing space is employed above the heat exchanger 10, or the spraying of water can also be carried out in the air duct passing into the heat exchanger. In the arrangement in accordance with the invention, an increased heat transfer face has been provided when the vertical or inclined metal tubes have been provided with ribs, which form a threading or spiral around the tubes. It is also possible to employ the technique known from lamellar radiators in order to increase the heat area at the replacement air side. Since a large quantity of water is employed in the arrangement of the present invention in the heat exchanger, it is easy to keep the heat exchanger clean, in which case it does not require a large amount of cleaning, which also provides the advantage that the exhaust side is not readily blocked.

The optimal ratio of the mass flows of water and of the air that delivers heat depends on the temperature and moisture of the air flow that delivers heat and on the initial temperature and the desired final temperature and the mass flow of the air flow that receives heat, i.e., there is an optimal ratio of $$\dot{m}_{water} / \dot{m}_{exhaust\ air}$$

and the magnitude of this ratio depends on a number of factors.

Figure 8:
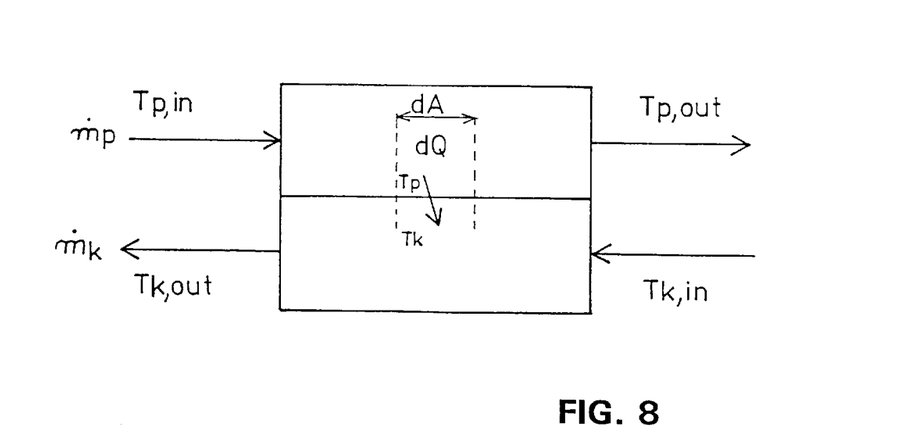
FIG. 8 is a schematic illustration of the principle of a heat exchanger in accordance with the invention in view of a mathematical examination of the transfer of heat.

In the following, the principles of the transfer of heat in an air-air heat exchanger in accordance with the invention will be explained with reference to FIG. 8.

1. Energy balances

A heat exchanger is assumed, in which replacement air is heated by means of exhaust air. The magnitude of the heat capacity transferred in the heat exchanger is equal to the change in the energy content in the exhaust air or to the change in the energy content in the replacement air. If no changes in phase take place in any of the air flows, the transferred heat capacity can be indicated as follows:

$$\dot{Q} = \dot{m}_p c_p (T_{p,in} - T_{p,out}) = \dot{m}_k c_k (T_{k,out} - T_{k,in})$$

wherein $\dot{m}_p$ = mass flow of the exhaust air (kg/s)

$c_p$=heat capacity of the exhaust air (J/kg/° C.)

$T_{p,in}$=the exhaust air temperature before the heat exchanger (° C.)

$T_{p,out}$=the exhaust air temperature after the heat exchanger (° C.)

and corresponding denotations with the subscript k refer to the replacement air (the subscript p refers to the exhaust air flow).

The same matter can also be presented by means of changes in enthalpy in the air flows, which formula is also applicable in cases in which changes in phase occur:

$$\dot{Q} = \dot{m}_p (h_{p,in} - h_{p,out}) = \dot{m}_k (h_{k,out} - h_{k,in})$$

wherein h=enthalpy of the air flow (J/kg).

In connection with air flows, mass flows $$\dot{m}_{ki}$$

of dry air (kgk.i./s) (=kilograms of dry air per second) and the enthalpy i (J/kgk.i) based on same are used, in which connection the energy balance is $$\dot{Q} = \dot{m}_{ki,p}(i_{p,in} - i_{p,out}) = \dot{m}_{ki,k}(i_{k,out} - i_{k,in})$$

2. Transfer of heat

The flow of heat from the exhaust air to the replacement air complies with the following formula:

$$d\dot{Q} = \alpha_{tot} dA(T_p - T_k)$$

wherein $d\dot{Q}$ = heat flow (W)

$\alpha_{tot}$=overall heat transfer coefficient (W/m²/° C.)

dA=area of heat face (m²)

$T_p$=temperature of exhaust air (° C.)

$T_k$=temperature of replacement air (° C.).

Since the temperatures of the air flows are changed as the flows pass through the heat exchanger, the formula is correct only when a small area element in the heat exchanger dA is examined in which the difference in temperature between the air flows does not essentially change.

When the entire heat exchanger is examined, the above formula must be integrated either numerically or, in simpler cases, also analytically. Then, for example, for a conventional counterflow heat exchanger, the following formula is obtained:

$$\dot{Q} = \alpha_{tot} A \Delta T_{ln}$$

wherein $\Delta Tl_n$=logarithmic difference in temperature.

3. Transfer of heat when condensation takes place at the side that delivers heat Above, a so-called dry transfer of heat was examined, in which phase changes do not take place at any of the heat faces. As the exhaust air from a paper machine is moist, a significant proportion of the transfer of heat often takes place when the moisture contained in the exhaust air condenses on a cold heat face. The condensing can be calculated, based on analogy between heat transfer and mass transfer, as follows:

$$d\dot{m}_{cond} = \frac{\alpha_p}{\overline{C}_p} dA(x_p - x_w)$$

wherein $\alpha_p$=heat transfer coefficient at exhaust air side (W/m²/° C.)

$\overline{C}_p$=specific heat capacity of exhaust air (J/kgk.i./° C.) (=J per kilogram of dry air per ° C.)

$x_p$=moisture of exhaust air (kgH$_2$O/kgk.i.) (=kilograms of H$_2$O per kilogram of dry air)

$x_w$=saturation moisture corresponding to temperature of the wall in the heat exchanger (kgH$_2$O/kgk.i.)

The heat capacity produced by the condensing is $$d\dot{Q}_{cond} = d\dot{m}_{cond} \Delta h_{vap}$$

wherein $\Delta h_{vap}$=vaporization enthalpy of water vapor (J/kg).

The difference between dry and moist transfers of heat is compared when the temperature of the heat transfer face is $T_w$:

$$d\dot{Q} = \alpha_p dA(T_p - T_w) \quad \text{dry}$$

$$d\dot{Q} = \alpha_p dA(T_p - T_w) + \frac{\alpha_p dA \Delta h_{vap}}{\overline{C}_p}(x_p - x_w) \quad \text{moist}$$

From these two formulas, it is possible to calculate a more illustrative presentation of how condensation enhances the transfer of heat compared with dry heat transfer.

$$d\dot{Q} = k\, \alpha_p\, dA\, (T_p - T_w)$$

wherein the coefficient k depends mainly on the moisture of the exhaust air.

For saturated exhaust air, the following values are obtained for the coefficient k, depending on the difference in temperature $T_p - T_w$:

| | $T_p - T_w =$ 10 | 20 | 30° C. |
|---|---|---|---|
| $T_p = $ 20° C. | k = 2.6 | 2.3 | 2.0 |
| 30 | 3.8 | 3.2 | 2.8 |
| 40 | 5.7 | 4.8 | 4.0 |
| 50 | 8.7 | 7.2 | 6.1 |
| 60 | 13.5 | 11.1 | 9.3 |
| 70 | 21.4 | 17.4 | 14.5 |
| 80 | 36.1 | 28.4 | 23.2 |

Since the wet temperatures of the exhaust air at different stages in the recovery of heat are typically of an order of from about 40° C. to about 60° C., in practice the condensation at the exhaust air side increases the transfer of heat 5–15-fold. In such a case, it is obvious that dry transfer of heat at the replacement air side becomes a factor that limits the transfer of heat.

In such a case, by making the heat face at the replacement air larger, a significant increase in the efficiency is obtained. With the ribbed-tube radiator technique the heat face at the replacement air side is typically 8 to 12 times as large as the heat face at the exhaust air side. With the lamellar-radiator technique the heat face at the replacement air side is typically increased 20–30-fold.

4. Transfer of heat from a water film flowing down in a tube to the tube wall

With regard to the transfer of heat between the water film and the tube wall, it can be estimated that this transfer is about two decades higher than the dry transfer of heat from an air flow.

5. Calculation of the overall heat transfer coefficient 5.1 Both heat faces are equally large In a conventional plate heat exchanger or tubular heat exchanger, the heat faces are equally large at both sides. In such a case, the overall heat transfer coefficient between the exhaust air and the replacement air can be stated simply:

$$\alpha_{tot} = \frac{1}{\frac{1}{\alpha_p} + \frac{s}{\lambda} + \frac{1}{\alpha_k}}$$

wherein $\alpha_p$=heat transfer coefficient at exhaust air side (W/m²/° C.)

$\alpha_k$=heat transfer coefficient at replacement air side (W/m²/° C.)

s=thickness of plate or tube wall (m)

$\lambda$=thermal conductivity of plate or tube wall (W/m/° C.)

The resistance to transfer of heat arising from the plate or from the tube wall can often be overlooked, in which case the formula is simplified to the form $$\alpha_{tot} = \frac{1}{\frac{1}{\alpha_p} + \frac{1}{\alpha_k}}$$

5.2 Heat face at the replacement air side has been enlarged

The heat face is taken in accordance with the exhaust air side, $A = A_p$. The heat face at the replacement air side is denoted by $A_k$. The overall heat transfer coefficient is then $$\alpha_{tot} = \cfrac{1}{\cfrac{1}{\alpha_p} + \cfrac{s}{\lambda} + \cfrac{A_p}{A_k \eta \alpha_k}}$$

wherein
η=efficiency of heat face
s=thickness of the wall of core tube (m)
λ=thermal conductivity of core tube (W/m/° C.)

The efficiency of a heat face is typically of an order of from about 0.8 to about 0.95.

Since the temperature of the ribs readily remains slightly lower than the surface temperature of the core tube, a rib efficiency $\eta_{rib}$ has been defined. In such a case, the formulas can be derived based on the assumption that the temperature of the ribs is the same as that of the core tube, but the transfer of heat is multiplied by the rib efficiency. Since transfer of heat into the replacement air takes place both from the ribs and from the bare portions of the core tube, the efficiency of heat face, which is present in the above formula, has been defined additionally, which efficiency is calculated from the rib efficiency $\eta_{rib}$, from the total heat face $A_k$ at the replacement air side, and from the heat face $A_{rib}$ of the ribs at the replacement air side:

$$\eta = 1 - \frac{A_{rib}}{A_k}(1 - \eta_{rib})$$

In the following, the patent claims will be given, and the various details of the invention can show variation within the scope of the inventive idea defined in the claims and differ even to a considerable extent from the details stated above by way of example only. As such, the examples provided above are not meant to be exclusive and many other variations of the present invention would be obvious to those skilled in the art, and are contemplated to be within the scope of the appended claims. It is also pointed out that the structures shown only in one or more of the illustrated heat exchangers may of course be incorporated into the other illustrated heat exchangers, or any heat exchanger in accordance with the invention, if desired and/or required.

What is claimed is:

1. A heat exchanger, comprising
a duct,
substantially parallel tubes arranged in said duct to define gaps therebetween,
first means for directing an air flow that delivers heat through said tubes,
second means for directing an air flow that receives heat through the gaps over an external surface of said tubes, said tubes including members projecting into the gaps to increase the external surface area of said tubes over which the air flow that receives heat passes,
each of said tubes including an inner wall, an inlet at a top region of said tube and an outlet at a bottom region of said tube below said inlet such that in each of said tubes, the air flow that delivers heat flows from said inlet to said outlet and condensate forms on said inner wall of said tube and flows toward said outlet, the air flow that delivers heat comprising air that is moist, saturated, or near its saturation curve,
collecting means arranged in said duct below said outlets of said tubes for collecting the condensate flowing along said inner walls of said tubes upon exiting from said tubes at said outlets,
spray means for spraying an aqueous medium in an atomized phase into the air flow that delivers heat before the air flow that delivers heat enters into said inlets of said tubes, and
heating means for heating the aqueous medium, said heating means being structured and arranged to be operative if the temperature and the moisture of the air flow that delivers heat differs substantially from values that are near its saturation curve.

2. A heat exchanger, comprising
a duct,
substantially parallel tubes arranged in said duct to define gaps therebetween,
first means for directing an air flow that delivers heat through said tubes,
second means for directing an air flow that receives heat through the gaps over an external surface of said tubes, said tubes including members projecting into the gaps to increase the external surface area of said tubes over which the air flow that receives heat passes,
each of said tubes including an inner wall, an inlet at a top region of said tube and an outlet at a bottom region of said tube below said inlet such that in each of said tubes, the air flow that delivers heat flows from said inlet to said outlet and condensate forms on said inner wall of said tube and flows toward said outlet, the air flow that delivers heat comprising air that is moist, saturated, or near its saturation curve,
collecting means arranged in said duct below said outlets of said tubes for collecting the condensate flowing along said inner walls of said tubes upon exiting from said tubes at said outlets,
spray means for spraying an aqueous medium in an atomized phase into the air flow that delivers heat before the air flow that delivers heat enters into said inlets of said tubes, and
a wall for dividing the air flow that delivers heat into first and second components, said spray means spraying the aqueous medium only into said first component.

3. The heat exchanger of claim 2, wherein said first component of the air flow that delivers heat is passed in close proximity to inlets of the gaps between said tubes through which the air flow receives heat is directed.

4. A method for transferring heat from an air flow that delivers heat to an air flow that receives heat utilizing a heat exchanger operating on the cross-flow principle, comprising the steps of:
arranging substantially parallel, vertically extending tubes in a duct to define gaps therebetween,
directing air that is moist, saturated, or near its saturation curve into and though said tubes to constitute the air flow that delivers heat, each of said tubes including an inner wall, an inlet at a top region of said tube and an outlet at a bottom region of said tube below said inlet such that in each of said tubes, the air flow that delivers heat flows from said inlet to said outlet and condensate forms on said inner wall of said tube and flows toward said outlet,
directing the air flow that receives heat in a substantially horizontal direction through the gaps over an external surface of said tubes,
collecting the condensate flowing along said inner walls of said tubes upon exiting from said tubes at said outlets, spraying an aqueous medium into the air flow that delivers heat before the air flow that delivers heat enters into said inlets of said tubes, and heating the aqueous medium if the temperature and the moisture of the air flow that delivers heat differs substantially from values that are near its saturation curve.

5. A method for transferring heat from an air flow that delivers heat to an air flow that receives heat utilizing a heat exchanger operating on the cross-flow principle, comprising the steps of:

arranging substantially parallel, vertically extending tubes in a duct to define gaps therebetween, directing air that is moist, saturated, or near its saturation curve into and though said tubes to constitute the air flow that delivers heat, each of said tubes including an inner wall, an inlet at a top region of said tube and an outlet at a bottom region of said tube below said inlet such that in each of said tubes, the air flow that delivers heat flows from said inlet to said outlet and condensate forms on said inner wall of said tube and flows toward said outlet, directing the air flow that receives heat in a substantially horizontal direction through the gaps over an external surface of said tubes, collecting the condensate flowing along said inner walls of said tubes upon exiting from said tubes at said outlets, dividing the air flow that delivers heat into first and second components, spraying an aqueous medium only into said first component before the air flow that delivers heat enters into said inlets of said tubes, and passing said first component in close proximity to an inlet of the air flow that receives heat into the gaps between said tubes.

* * * * *